United States Patent
Chidambarrao et al.

(10) Patent No.: US 8,037,433 B2
(45) Date of Patent: Oct. 11, 2011

(54) SYSTEM AND METHODOLOGY FOR DETERMINING LAYOUT-DEPENDENT EFFECTS IN ULSI SIMULATION

(75) Inventors: Dureseti Chidambarrao, Weston, CT (US); Tong Li, Pine Brook, NJ (US); Richard Q. Williams, Essex Junction, VT (US); David W. Winston, Asheville, NC (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 12/196,471

(22) Filed: Aug. 22, 2008

(65) Prior Publication Data

US 2010/0050138 A1    Feb. 25, 2010

(51) Int. Cl.
*G06F 17/50* (2006.01)
(52) U.S. Cl. .................................... 716/100
(58) Field of Classification Search .............. 716/1, 100
See application file for complete search history.

(56) References Cited

U.S. PATENT DOCUMENTS

| | | | |
|---|---|---|---|
| 4,924,430 A | 5/1990 | Zasio et al. | |
| 7,051,314 B2 | 5/2006 | Goto | |
| 7,206,731 B2 * | 4/2007 | Sercu et al. | 703/14 |
| 7,337,420 B2 | 2/2008 | Chidambarrao et al. | |
| 7,761,278 B2 * | 7/2010 | Chidambarrao et al. | 703/14 |
| 2005/0289497 A1 * | 12/2005 | Matsumoto | 716/15 |
| 2007/0208552 A1 * | 9/2007 | Reddy et al. | 703/19 |
| 2008/0195983 A1 * | 8/2008 | Chidambarrao et al. | 716/2 |
| 2009/0172616 A1 * | 7/2009 | Lapanik | 716/5 |

* cited by examiner

*Primary Examiner* — Jack Chiang
*Assistant Examiner* — Suchin Parihar
(74) *Attorney, Agent, or Firm* — Scully, Scott, Murphy & Presser, P.C.; H. Daniel Schnurmann

(57) ABSTRACT

A layout of a semiconductor circuit is analyzed to calculate layout-dependant parameters that can include a mobility shift and a threshold voltage shift. Layout-dependant effects that affect the layout dependant parameters may include stress effects, rapid thermal anneal (RTA) effects, and lithographic effects. Intrinsic functions that do not reflect the layout-dependant effects are calculated, followed by calculation of scaling modifiers based on the layout-dependent parameters. A model output function that reflects the layout-dependant effects is obtained by multiplication of each of the intrinsic functions with a corresponding scaling parameter.

30 Claims, 1 Drawing Sheet

SYSTEM AND METHODOLOGY FOR DETERMINING LAYOUT-DEPENDENT EFFECTS IN ULSI SIMULATION

FIELD OF THE INVENTION

The present invention relates to a methodology for determining layout-dependent effects in ultra-large-scale-integration (ULSI) simulations, and to a system effecting the same.

BACKGROUND OF THE INVENTION

Accurate modeling of semiconductor devices is needed to provide reliable circuit simulation results that can predict the behavior of an ultra-large-scale-integration (ULSI) semiconductor circuit. Typically, a ULSI semiconductor circuit includes more than 100,000 transistors, and a large scale circuit simulation is required to verify functionality of the ULSI semiconductor circuit. Often, such circuit simulations are used during a design phase of a circuit to predict circuit characteristics such as the drive current of an individual circuit component, the signal delay between multiple circuit components, or the overall performance of a circuit in terms of the operating speed of a chip and interaction with other chips.

Models for circuit design are referred to as compact models, which include analytical compact models and approximate models. An analytical compact model employs an extensive array of circuit parameters to provide an accurate model for a semiconductor device. While accuracy of a circuit simulation employing an analytical compact model tends to be high, such simulations typically require a long run time. In addition, further refinement of the analytical compact model to account for additional layout dependency of circuit parameters may increase the complexity of the analytical compact model and the run time beyond a manageable level.

In contrast, approximate models employ less parameters for simulation. Approximate models include table-based approximate models and switch-level approximate models. A table-based approximate model provides values for various circuit elements based on layout parameters. The circuit elements may include current sources, inductors, charge elements such as a capacitor, etc. The table-based approximate model employs predefined tables to calculate such circuit elements, and as a consequence, tends to be much simpler than analytical compact models and requires a shorter run time. A switch-level approximate model provides a high level circuit simulation through a set of formulae that describes a time-dependant response of the semiconductor circuit. The switch-level approximate model may provide an accurate simulation result in a shorter run time than analytical compact models.

Recently, various layout-dependant effects have been known in the semiconductor technology including effects of engineered stress, effects of local reflectivity on temperature during rapid thermal anneals, and lithographic effects on the physical shape of contact level (CA) vias and subsequent electrical impacts. Such layout-dependant effects on a semiconductor device depend on many parameters of adjacent semiconductor devices. Consequently, attempts to incorporate the layout-dependent effects into an analytical compact model typically result in an inordinate increase in complexity and run time, rendering such incorporation impractical.

Incorporation of the layout-dependant effects into an approximate model faces similar challenges. Expanding entries of a table file in a table-based approximate model to account for layout-dependant effects increases the dimension of the table file for each layout-dependant effect to be accounted for. As the table file becomes larger and more complex, generation time for the table file increases, and more operations are required to search the table, contributing to an increase in overall run time. Thus, incorporation of the layout-dependant effects into the table-based approximate model can make the run time of a simulation unmanageable.

Likewise, modification of a switch-level approximate model to incorporate layout dependant effects also requires extensive modification to the formulae for time-dependant responses to include the effects of the elements that cause the layout-dependant effects, thereby increasing the run time beyond a manageable level.

In view of the above, there exists a need for methodology for accurately reflecting layout-dependant effects in a circuit simulation result without requiring an excessive run time, and a system including a model for effecting the same.

SUMMARY OF THE INVENTION

The present invention addresses the needs described above by providing an approximate model incorporating a scaling factor that modifies simulation results through formulae that are equivalent to adjustments in quantities such as the mobility shift and threshold voltage shift generated by layout-dependant effects.

According to the present invention, a layout of a semiconductor circuit is analyzed to calculate layout-dependant parameters such as a mobility shift and a threshold voltage shift. Layout-dependent effects that affect the layout-dependant parameters may include stress effects, rapid thermal anneal (RTA) effects, and lithographic effects. Intrinsic functions that do not reflect the layout-dependant effects are calculated, followed by calculation of scaling modifiers based on the layout-dependant parameters. A model output function that reflects the layout-dependant effects is obtained by multiplication of each of the intrinsic functions with a corresponding scaling parameter.

According to an embodiment of the present invention, a method for generating a model output value from an approximate model is provided, which comprises:

generating a first value for an intrinsic function of a layout analysis data of an approximate model based on a layout analysis data of a semiconductor device;

generating at least one layout-dependant parameter for the semiconductor device, wherein the layout-dependent parameter is determined by at least another layout analysis data of at least another semiconductor device;

generating a second value for a scaling modifier that scales the first value and varies as a function of the at least one layout-dependant parameter; and generating a model output value by multiplying the first value and the second value.

The intrinsic function is a function of the layout analysis data of the semiconductor device.

In one embodiment, the intrinsic function is independent of any other layout analysis data than the layout analysis data of the semiconductor device.

In another embodiment, the at least one layout-dependant parameter comprises a global constant or a local constant.

The at least one layout-dependant parameter may include a stress component generated by the other semiconductor device and applied to the semiconductor device. The at least one layout-dependant parameter may include a threshold voltage shift component of the semiconductor device due to an areal reflectivity around the semiconductor device in a rapid thermal anneal process, wherein the areal reflectivity depends on the at least other layout analysis data. The at least one layout-dependant parameter may include a threshold voltage shift component, a resistive component, or a stress component due to lithographic effects on the semiconductor device in physical implementation, wherein the lithographic effects depends on the at least other layout analysis data.

In even another embodiment, the scaling modifier comprises a sum of a first scaling modifier component and a second scaling modifier component, wherein the first scaling modifier component is dependent on relative mobility shift of charge carriers in the semiconductor device, and wherein the second scaling modifier component is not dependent on the relative mobility shift.

The second scaling modifier component may be dependent on a threshold voltage shift. The second scaling modifier component may be dependent on a voltage bias applied to the semiconductor device.

In yet another embodiment, the relative mobility shift is the only variable for the first scaling modifier component, and the threshold voltage shift and the voltage bias comprise a complete set of variables for the second scaling modifier component.

In still another embodiment, the second value is 1 if external stress is not applied to the semiconductor device and the semiconductor device does not have any threshold voltage shift due to any other semiconductor device.

The intrinsic function may be a table-based function of the approximate model. The intrinsic function may be a switch-level function of the approximate model.

In a further embodiment, the scaling modifier is a non-linear function of the at least one layout-dependant parameter.

According to another aspect of the present invention, a method for running a simulation employing an approximate model is provided, which comprises:

generating a first value for an intrinsic function of a layout analysis data of an approximate model based on a layout analysis data of a semiconductor device;

generating at least one layout-dependant parameter for the semiconductor device, wherein the layout-dependant parameter is determined by at least another layout analysis data of at least another semiconductor device;

generating a second value for a scaling modifier that scales the first value and varies as a function of the at least one layout-dependant parameter;

generating a model output value by multiplying the first value and the second value;

transmitting the model output value to a simulation engine; and running a simulation of a semiconductor circuit employing the model output value.

According to yet another aspect of the present invention, a system for modeling a semiconductor device is provided, which comprises:

a first modeling means for generating a first value for an intrinsic function on a layout analysis data of a semiconductor device;

a second modeling means for generating at least one layout-dependant parameter for the semiconductor device, wherein the layout-dependant parameter is determined by at least another layout analysis data of another semiconductor device; and a third modeling means for generating a second value for a scaling modifier that scales the first value and varies as a function of the at least one layout-dependant parameter, wherein a model output value of an approximate model is generated by multiplying the first value and the second value.

In one embodiment, each of the first modeling means, the second modeling means, and the third modeling means is a program residing in a computer.

In another embodiment, the layout analysis data comprises a netlist.

In yet another embodiment, the layout analysis data resides on storage medium as a data format used for exchange of layout data of integrated circuits.

DETAILED DESCRIPTION OF THE INVENTION

Figure 1:
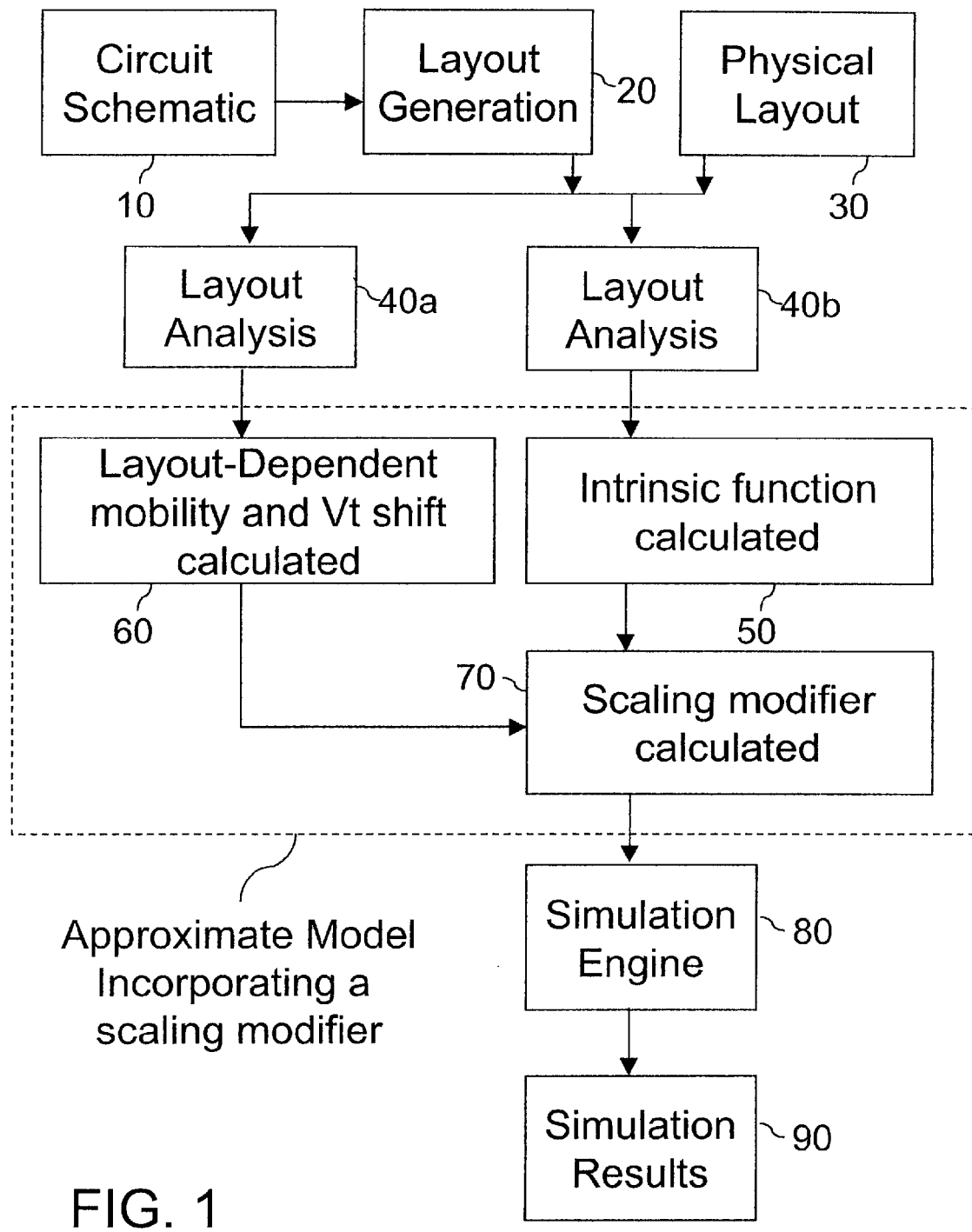
FIG. 1 is a flow chart of steps employed for generating and utilizing a model output value from an approximate model incorporating a scaling modifier for simulation of a semiconductor circuit according to the present invention.

As stated above, the present invention relates to a methodology for determining layout-dependent effects in ultra-large-scale-integration (ULSI) simulations, and to a system effecting the same, which are now described in detail with the accompanying FIGURE.

Referring to FIG. 1, a flow chart of steps for employing an approximate model incorporating a scaling modifier to simulate semiconductor circuit is shown. The steps of the flow chart are employed to generate at least one model output value from the approximate model of the present invention. Layout-dependant effects are calculated as a scaling modifier that is multiplied by an intrinsic function that is not dependent on layout-dependant effects. The layout-dependant effects are thus decoupled from the calculation of values for the intrinsic function, and may be performed in a speedy manner without requiring an excessive computation time. The at least one model output value is provided to a simulation engine, which runs a simulation of the semiconductor circuit. The use of the scaling modifier to aggregate the effects of the layout dependant function simplifies the calculation in the approximate model according to the present invention.

Referring to step 10, a circuit schematic is provided for a semiconductor circuit for which a circuit simulation is desired. The format of the circuit schematic may vary depending on the type of integrated circuit (IC) to be simulated. For example, the integrated circuit may be an application specific integrated circuit (ASIC) or a standard integrated circuit for general applications. The circuit schematic may be provided by an intellectual property (IP) provider, a core developer, or a design company, or may be generated by the operator of a design flow, or may come from other sources.

The circuit schematic may be in the form of an electronic system level (ESL) description, a register transfer level (RTL) description, a gate level description, or a combination thereof. These formats correspond to different phases of a design process. In general, the methods and systems of the present invention may be employed with any format of the circuit schematic.

The electronic system level (ESL) description is a format for the circuit schematic that is generated based on the functional requirements of the chip. Electronic system level description and verification is a design methodology that focuses on the higher abstraction level without regard to lower level implementation. The goal of the ESL description is to enhance the probability of a successful implementation of functionality. Appropriate abstractions are utilized to generate a global level understanding of the chip to be designed. To this end, a high level programming language such as C or C++ is employed as an abstract modeling language to model the behavior of the entire system to be contained in a chip. Typically, this process is manual, although automation of this step by electronic design automaton (EDA) has been under investigation.

The register transfer level (RTL) description is another format for the circuit schematic that is generated from the electronic system level (ESL) description. Register transfer level (RTL) description is a description of a semiconductor chip design in terms of its operation. Specifically, the behavior of a circuit is defined in terms of data transfer, or flow of signals between hardware registers in the RTL description. Logical operations are performed on the data. A hardware description language (HDL) such as Verilog™ or VHDL™ is employed to create high-level representations of a circuit, from which lower level representations and ultimately actual discrete devices and wiring may be derived.

The gate level description is yet another format for the circuit schematic. In this case, logic synthesis is performed to convert the RTL description in the form of the hardware description language (HDL) into the gate level description of the chip by a logic synthesis tool. Specifically, the gate level description is a discrete netlist of logic gate primitives, or "Boolean logic primitives."

Referring to step 20, placement and routing tools are employed to generate a layout for the semiconductor circuit. Logic gates and other device components of the netlist are placed in a "layout," or a chip design. The chip design is then routed, i.e., wires are added to the placed components to provide interconnection between the components' signal and power terminals. Typically, this process is performed with tools employing electronic design automation (EDA) features. The layout of the semiconductor chip is subsequently made available for layout analysis.

Referring to step 30, a physical layout may be provided from an external source instead of the layout of a semiconductor chip that is generated from a circuit schematic in steps 10 and 20. Like a circuit schematic, such a physical layout may be extracted from semiconductor hardware, or may be provided by an intellectual property (IP) provider, a core developer, or a design company, or may be generated by the operator of a design flow, or may come from other sources. Preferably, the physical layout is in the format of a gate level description for immediate extraction of circuit parameters in the next step of layout analysis.

Referring to steps 40a and 40b, the layout generated from a circuit schematic at step 20 or the physical layout provided at step 30 is transmitted to a layout analysis means, which may be a computer program. The layout or the physical layout is analyzed to extract circuit elements from the layout or from the physical layout. The circuit elements include current sources, charge elements that may be present in a capacitor, and inductors. The circuit elements may be parasitic or non-parasitic. The layout analysis may consist of multiple steps, for example, step 40a derives intrinsic device parameters such as transistor geometries such as the physical length and width while step 40b derives detailed layout-dependent measurements, or all layout analysis can be combined into a single step.

The circuit parameters used in simulation including extracted parameters and user-defined parameters may include dimensions of a semiconductor device, bias conditions of a semiconductor device, process corner assumptions of a semiconductor device, etc. Non-limiting examples of dimensions of a semiconductor device include a length and a width of a transistor, contact area of a contact via, a length, a width, and a depth of a capacitor, etc. Non-limiting examples of bias conditions of a semiconductor device include a gate-to-source bias of a transistor, a drain-to-source bias of a transistor, a gate-to-body bias of a transistor, a voltage bias across a diode, a voltage bias across a capacitor, etc. The process corner assumptions may include statistical variations in the circuit parameters expected in semiconductor chips due to statistical variations in the process parameters during the manufacture. The process corner assumptions may further include variations in ambient temperature during the normal course of operation of the semiconductor chips.

The layout analysis data generated at this step may comprise a netlist. Typically, the layout analysis data resides on storage medium as a data format used for exchange of layout data of integrated circuits.

According to the present invention, an approximate model incorporating a scaling modifier is employed to generate a set of model output values for simulation of the semiconductor circuit. In the approximate model of the present invention, a model output value is approximated as a product of a first value and a second value. A model output function $f_{layout\text{-}dependant}$ of the present invention has the form:

$$f_{layout\text{-}dependant} = f_{intrinsic} \times S(\text{instance}),$$

in which $f_{intrinsic}$ is an intrinsic function that is dependent only on the intrinsic device parameters of the semiconductor device for which the model output function is evaluated, and S(instance) is a scaling modifier that depends on layout-dependant parameters of other semiconductor devices than the semiconductor device for which the model output function is evaluated and optionally depends on a subset the intrinsic device parameters. The value of the intrinsic function is the first value and the value of the scaling modifier S(instance) is the second value. The intrinsic function reflects the effects of intrinsic device parameters of the semiconductor device on the model output function, while the scaling modifier reflects the effects of surrounding semiconductor devices.

When a semiconductor circuit employs a plurality of instances of a semiconductor device of identical structure, the intrinsic function is the same across the plurality of semiconductor devices with comparable intrinsic device parameters since each instance of the semiconductor device is the same as the rest. However, the scaling modifier may vary from instance to instance since the environment in which each instance of the semiconductor device is placed is different for every instance. Thus, the intrinsic function depends only on the intrinsic properties of the semiconductor device, i.e., the intrinsic device parameters of the semiconductor device itself, while the scaling function is a function of each instance of the semiconductor device since each instance of the semiconductor device is bound to have different placement in a semiconductor chip, and as a consequence, a different layout environment in the semiconductor chip.

Referring to step 50, the layout analysis data of the semiconductor device is transmitted to a first modeling means, which may be a computer program. The first modeling means generates a first value for an intrinsic function based on the layout analysis data of the semiconductor device in the semiconductor circuit. In other words, the intrinsic function is a function of intrinsic device parameters of the semiconductor device for which the model output value is calculated. The intrinsic function is dependent on the intrinsic device characteristics of the semiconductor device for which the model output value is calculated, and is independent of any other semiconductor devices surrounding the semiconductor device for which the intrinsic function provides characterization. Thus, the intrinsic function is dependent on the layout analysis data of the semiconductor device for which the model output value is calculated, and is independent of any other layout analysis data than the layout analysis data of the semiconductor device. Since the intrinsic function is independent of any layout analysis data from other semiconductor devices other than the layout analysis data of the semiconductor device, the layout analysis data for other semiconductor devices is not needed at this step.

The intrinsic function may be a table-based function of the approximate model or a switch-level function of the approximate model according to the present invention. If a table-based approximate model is employed, values for various circuit elements may be generated based on layout analysis data of the semiconductor device. Other semiconductor devices that are located around the semiconductor device for which the intrinsic function provides a simulation input value do not affect the value of the intrinsic function of the table-based approximate model of the present invention. In other words, layout-dependent effects from other semiconductor devices are not included in the intrinsic function of the table-based approximate model. Thus, the predefined tables for the intrinsic function of the table-based approximate model include only entries related to the semiconductor device itself, and does not contain an entry related to surrounding semiconductor devices.

Likewise, if a switch-level approximate model is employed, a high-level circuit response simulation is generated based on layout analysis data of the semiconductor device of concern. Other semiconductor devices that are located around the semiconductor device for which the intrinsic function provides a simulation input value do not affect the value of the intrinsic function of the switch level approximate model of the present invention. Layout-dependent effects from other semiconductor devices are not included in the intrinsic function of the switch-level approximate model. Thus, all of the variables in the set of formulae that describes the response of the semiconductor circuit are related to the semiconductor device itself, and are not related to surrounding semiconductor devices.

To effect the calculation of the intrinsic function, a first modeling means may be employed, which may be a program residing in a computer. The first modeling means generates the first value for the intrinsic function of the semiconductor device based on the layout analysis data of the semiconductor device.

For example, the first intrinsic function may provide a circuit element such as the magnitude of a current source. Non-limiting examples of magnitudes of current sources include the on-current of a transistor, the off-current of a transistor, and magnitudes of various leakage currents in a semiconductor device. Similarly, the first intrinsic function may provide a charge element, a capacitive element, an inductive element, a time-dependant voltage output, etc. The first intrinsic function may also be a higher-level functional form such as a signal delay through a given stage for a given set of input switching conditions.

Referring to step 60, the layout analysis data of the entire semiconductor circuit is transmitted to a second modeling means, which may be another computer program. The second modeling means generates layout-dependent parameters from the layout analysis data of the semiconductor chip, which include the layout analysis data of the semiconductor device on which the intrinsic function is dependant and the layout analysis data of other semiconductor devices located in the semiconductor chip and surrounding the semiconductor chip in point. The layout analysis data of the other semiconductor devices affect the model output function of the semiconductor device through layout-dependent effects, which include stress effects, threshold voltage shift effects, lithographic effects, etc.

The at least one layout-dependant parameter may include a global constant or a local constant. A global constant is a constant derived from the entirety of the semiconductor circuit and applied to all semiconductor devices in a semiconductor chip. The global constant is the same for all semiconductor devices in the semiconductor circuit. For example, an overall level of compressive stress or tensile stress applied to the entirety of a semiconductor substrate is a global constant. Also, a general shift in threshold voltages in all semiconductor devices due to an overall pattern factor in a design level of the semiconductor circuit is also a global constant.

In contrast, a local constant is a constant derived from a local subset less than the entirety of the semiconductor circuit and applied to the semiconductor device. The local constant may vary from semiconductor device to semiconductor device in a semiconductor chip. For example, a local compressive stress or a local tensile stress applied to a semiconductor device by other semiconductor devices surrounding the semiconductor device is a local constant. Also, a shift in threshold voltages caused by a local pattern factor in a design level of the semiconductor circuit is also a local constant.

In one embodiment of the present invention, the at least one layout-dependant parameter includes a stress component generated by at least one other semiconductor device and applied to the semiconductor device. The stress component depends on the layout analysis data of at least one other semiconductor device that is different from the semiconductor device for which the model output value is evaluated.

In another embodiment of the present invention, the at least one layout-dependant parameter includes a threshold voltage shift component of the semiconductor device due to an areal reflectivity around the semiconductor device in a rapid thermal anneal process. The areal reflectivity depends on the layout analysis data of at least another semiconductor device that is different from the semiconductor device for which the model output value is evaluated.

In yet another embodiment, the at least one layout-dependant parameter includes a threshold voltage shift component or a stress component due to lithographic effects on the semiconductor device in physical implementation. The lithographic effects depend on the layout analysis data of at least another semiconductor device that is different from the semiconductor device for which the model output value is evaluated.

The layout-dependent effects of other semiconductor devices on the semiconductor device in point is captured by parameterization of the layout-dependent effects through a relative mobility shift $\delta m$ of charge carriers in the semiconductor device and a threshold voltage shift "$\delta Vt$." The relative mobility shift $\delta m$ and the threshold voltage shift $\delta Vt$ may be a function of a global constant, a local constant, and/or any other layout analysis data extracted from the other semiconductor device that surrounds the semiconductor device in point. The relative mobility shift $\delta m$ and the threshold voltage shift $\delta Vt$ may also be a function of the layout analysis data extracted from the semiconductor device in point.

One example of parameters that affect the mobility shift $\delta m$ and the threshold voltage shift $\delta Vt$ is a "global stress," that is, a stress applied to a general transistor device region generated from the semiconductor substrate. A global stress is generated by such structures as SiGe stress relaxed buffer layers, Si:C stress relaxed buffer layers, or silicon germanium structures on an insulator.

Another example of parameters that affect the mobility shift δm and the threshold voltage shift δVt is a "local stress," that is, a stress applied only to local areas adjacent to the channel from a local structure. A local stress is generated by such structures as stress liners, embedded SiGe source/drain structures, embedded Si:C source/drain structures, stress-generating shallow trench isolation structures, and stress-generating silicides.

Yet another example of parameters that affect the mobility shift δm and the threshold voltage shift δVt is a pattern factor in a design level, i.e., the areal density of shapes in a certain design level. Such a pattern factor may impact the physical structure of a semiconductor device as manufactured in a semiconductor chip by a systematic structural variation that correlates with the pattern factor.

For example, the depth of deep trenches and their capacitance may correlate with a pattern factor for the deep trenches. The pattern factor is a layout analysis data that may be obtained from the layout or the physical layout at the layout analysis step, i.e., at step 40a. Also, a pattern factor of shapes in a design level may affect the local reflectivity of a region containing the semiconductor device in a physical semiconductor substrate. Variations in the local reflectivity in the physical semiconductor substrate may result in variations in dopant activation and consequent changes in the threshold voltage, i.e., a contribution to the threshold voltage shift δVt. The pattern factor is a part of layout analysis data that may be obtained from the layout or the physical layout at the layout analysis step in this case, too.

Still another example of parameters that affect the mobility shift δm and the threshold voltage shift δVt is physical dimensions of structures that are affected in lithographic steps by surrounding patterns. For example, a lithographic pattern for a semiconductor device may be affected by lithographic effects from surrounding lithographic patterns that define neighboring semiconductor devices. As the lithographic pattern is transferred into a physical structure, the dimensions of the physical structure are affected by the structure of neighboring semiconductor devices, i.e., the layout analysis data of the semiconductor devices that surround the semiconductor device in point. Changes in the physical dimensions of the semiconductor device may trigger the mobility shift δm and the threshold voltage shift δVt.

Referring to step 70, the layout-dependent parameters are transmitted to a third modeling means, which may be yet another computer program. The third modeling means generates a single scalar, which is the scaling modifier S(instance) described above, to be multiplied by the intrinsic function. The product of the scaling modifier and the intrinsic function is an estimation of the model output value for the simulation parameter derived from the semiconductor device. The various layout-dependent effects, i.e., the effects of presence of other semiconductor devices on the device characteristics of the semiconductor device in point, to be reflected on the model output value are captured by the scaling modifier, which may, or may not, be time dependent. The value of the scaling modifier S(instance) is 1 if no relative layout-dependent effects are provided by other semiconductor devices around the semiconductor device. For example, if the layout-dependent effects consist of external stress and a threshold voltage shift, the value of the scaling modifier S(instance) is 1 if the external stress relative to a reference level is not applied to the semiconductor device and the semiconductor device does not have any threshold voltage shift due to any other semiconductor device.

The scaling modifier S(instance) is a function of at least one layout-dependant parameter affected by layout-dependent effects. For example, the scaling modifier S(instance) may be a function of external stress applied to the semiconductor device by the other semiconductor devices around the semiconductor device in point. Further, the scaling modifier S(instance) may be a function of a threshold voltage shift on the semiconductor device by the other semiconductor devices around the semiconductor device in point. Yet further, the scaling modifier S(instance) may be a function of a parameter that characterizes lithographic effects on device characteristics of the semiconductor device by the other semiconductor devices proximately located around the semiconductor device in point. The external stress, the threshold voltage shift, and the parameter that characterizes lithographic effects on device characteristics are examples of the at least one layout-dependant parameter.

The scaling modifier S(instance) may be a linear function of the at least one layout-dependant parameter, i.e., a polynomial of the first order of the at least one layout-dependant parameter. Alternately, the scaling modifier S(instance) may be a non-linear function of the at least one layout-dependant parameter. For example, the scaling modifier S(instance) may be a polynomial of n-th degree of the at least one layout-dependant parameter, wherein n is an integer greater than 1.

According to the present invention, the scaling modifier S(instance) may comprise a sum of a first scaling modifier component $f_1(δm)$ and a second scaling modifier component $f_2(δVt, bias)$, i.e., S(instance)=$f_1(δm)+f_2(δVt, bias)$. The first scaling modifier component $f_1(δm)$ is dependent on the relative mobility shift δm of charge carriers in the semiconductor device. The second scaling modifier component $f_2(δVt, bias)$ is dependent on the threshold voltage shift δVt. In general, the second scaling modifier component $f_2(δVt, bias)$ is also dependent on a voltage bias, represented as the variable "bias," which is applied to the semiconductor device. In the case of any shift is absent in the mobility of charge carriers and the threshold voltage, the scaling modifier S(instance) is unity, i.e., S(instance)$|_{δm=0, δVt=0}$=$f_1(0)+f_2(0, bias)$=1

The second scaling modifier component $f_2(δVt, bias)$ is not dependent on the relative mobility shift δm. Also, the first scaling modifier component $f_1(δm)$ is not dependent on the threshold voltage shift δVt and the voltage bias "bias." Thus, the effect of the mobility shift m and the effect of threshold voltage shift δVt and the voltage bias "bias" are separated into two independent components of the scaling modifier S(instance).

In one embodiment, the relative mobility shift δm is the only variable for the first scaling modifier component $f_1(δm)$, and the threshold voltage shift δVt and the voltage bias "bias" comprise a complete set of variables for the second scaling modifier component $f_2(δVt, bias)$.

Referring to step 80, the model output value obtained by the product of the value of the intrinsic function and the value of the scaling modifier S(instance) is transmitted to a simulation engine. The model output value may, or may not, be a time-dependant value.

While the present invention is described with a single model output value, the methods of the present invention may be repeatedly applied to generate a set of model output values, each of which is a product of a value of an intrinsic function and a value of a scaling modifier. This is typically the case in ultra-large-scale-integration circuits that typically employ more than 100,000 semiconductor devices in a semiconductor chip.

The simulation engine runs a simulation employing a model output value or a set of model output values for the semiconductor circuit. Referring to step 90, simulation results are output from the simulation engine once the simulation is completed. If the simulation results do not meet a predefined specification, the circuit schematic or the physical layout may be modified to effect improvement in the performance of the semiconductor circuit.

By separating each model output value into a value of an intrinsic function and a value of scaling modifier, the approximate model incorporating the scaling modifier according to the present invention provides simple and expedient methods for incorporating the effects of the other semiconductor devices surrounding a semiconductor device. The layout-dependent effects from the other semiconductor devices are parametrized with the relative mobility shift δm and the threshold voltage shift δVt, the voltage bias "bias" is maintained as a separate variable to incorporate any changes to the threshold voltage shift δVt as a function of the voltage bias "bias," or to enable evaluation of the changes in the model output value as an explicit function of the voltage bias "bias." Thus, the present invention provides methods and systems for effecting an efficient calculation of the layout-dependent effect within a reasonable run time for the simulation engine.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A computer-implemented method for calculating a model output value from an approximate model comprising:
providing an approximate model residing in a device including at least an intrinsic function and a scaling modifier;
calculating, by employing a first modeling means that is a program residing in a computer, a first value for said intrinsic function of said approximate model based on a layout analysis data of a layout of a semiconductor device;
generating, employing said computer, at least one layout-dependant parameter for said semiconductor device, wherein said layout-dependant parameter is determined by at least another layout analysis data of at least another layout of at least another semiconductor device;
calculating, by employing a second modeling means that is a program residing in said computer or another computer, a second value for said scaling modifier that scales said first value and varies as a function of said at least one layout-dependant parameter; and
calculating, by employing said computer or said other computer, a model output value that is equal to a product of said first value and said second value.

2. The method of claim 1, wherein said intrinsic function is independent of any other layout analysis data other than said layout analysis data of said semiconductor device.

3. The method of claim 1, wherein said at least one layout-dependant parameter comprises a global constant or a local constant.

4. The method of claim 3, wherein said at least one layout-dependant parameter includes at least one stress component generated by said other semiconductor device and applied to said semiconductor device.

5. The method of claim 3, wherein said at least one layout-dependant parameter includes a threshold voltage shift component of said semiconductor device due to an areal reflectivity around said semiconductor device in a rapid thermal anneal process, wherein said areal reflectivity depends on said at least other layout analysis data.

6. The method of claim 3, wherein said at least one layout-dependant parameter includes a threshold voltage shift component or a stress component due to lithographic effects on said semiconductor device in physical implementation, wherein said lithographic effects depends on said at least other layout analysis data.

7. The method of claim 1, wherein said scaling modifier comprises a sum of a first scaling modifier component and a second scaling modifier component, wherein said first scaling modifier component is dependent on relative mobility shift of charge carriers in said semiconductor device, and wherein said second scaling modifier component is not dependent on said relative mobility shift.

8. The method of claim 7, wherein said second scaling modifier component is dependent on a threshold voltage shift.

9. The method of claim 8, wherein said second scaling modifier component is dependent on a voltage bias applied to said semiconductor device where said voltage bias consists of electrical potentials applied to at least one terminal.

10. The method of claim 9, wherein said relative mobility shift is the only variable for said first scaling modifier component, and said threshold voltage shift and said voltage bias comprise a complete set of variables for said second scaling modifier component.

11. The method of claim 1, wherein said second value is 1 if external stress relative to a reference level is not applied to said semiconductor device and said semiconductor device does not have any threshold voltage shift due to any other semiconductor device.

12. The method of claim 1, wherein said intrinsic function is a table-based function of said approximate model.

13. The method of claim 1, wherein said intrinsic function is a switch-level function of said approximate model.

14. The method of claim 1, wherein said scaling modifier is a non-linear function of said at least one layout-dependant parameter.

15. A computer-implemented method for running a simulation employing an approximate model comprising:
providing an approximate model residing in a device and including at least an intrinsic function and a scaling modifier;
calculating, by employing a first modeling means that is a program residing in a computer, a first value for said intrinsic function of said approximate model based on a layout analysis data of a layout of a semiconductor device;
generating, employing said computer, at least one layout-dependant parameter for said semiconductor device, wherein said layout-dependant parameter is determined by at least another layout analysis data of at least another layout of at least another semiconductor device;
calculating, by employing a second modeling means that is a program residing in said computer or another computer, a second value for said scaling modifier that scales said first value and varies as a function of said at least one layout-dependent parameter;
calculating, employing said computer or said other computer, a model output value that is equal to a product of said first value and said second value;
transmitting said model output value to a simulation engine; and
running a simulation of a semiconductor circuit employing said model output value.

16. The method of claim 15, wherein said intrinsic function is independent of any other layout analysis data other than said layout analysis data of said semiconductor device.

17. The method of claim 15, wherein said at least one layout-dependant parameter comprises a global constant or a local constant.

18. The method of claim 17, wherein said at least one layout-dependant parameter includes at least one stress component generated by said at least one other semiconductor device and applied to said semiconductor device.

19. The method of claim 17, wherein said at least one layout-dependant parameter includes a threshold voltage shift component of said semiconductor device due to an areal reflectivity around said semiconductor device in a rapid thermal anneal process, wherein said areal reflectivity depends on said at least other layout analysis data.

20. The method of claim 17, wherein said at least one layout-dependant parameter includes a threshold voltage shift component or a stress component due to lithographic effects on said semiconductor device in physical implementation, wherein said lithographic effects depends on said at least other layout analysis data.

21. The method of claim 15, wherein said scaling modifier comprises a sum of a first scaling modifier component and a second scaling modifier component, wherein said first scaling modifier component is dependent on relative mobility shift of charge carriers in said semiconductor device, and wherein said second scaling modifier component is not dependent on said relative mobility shift.

22. The method of claim 15, wherein said second value is 1 if external stress relative to a reference level is not applied to said semiconductor device and said semiconductor device does not have any threshold voltage shift due to any other semiconductor device.

23. The method of claim 15, wherein said scaling modifier is a non-linear function of said at least one layout-dependant parameter.

24. A system for modeling a semiconductor device comprising:
a device embodying an approximate model including at least an intrinsic function and a scaling modifier;
a first modeling means that is a program residing in a computer, said first modeling means residing in said computer and configured to calculate a first value for said intrinsic function of said approximate model based on a layout analysis data of a layout of a semiconductor device;
a second modeling means that is a program residing in said computer or another computer, said second modeling means configured to calculate at least one layout-dependant parameter for said semiconductor device, wherein said layout-dependant parameter is determined by at least another layout analysis data of another layout of at least another semiconductor device; and
a third modeling means that is a program residing in said computer or said other computer or yet another computer, said third modeling means configured to calculate a second value for a scaling modifier that scales said first value and varies as a function of said at least one layout-dependant parameter, wherein said system is configured to calculate a model output value of said approximate model that is equal to a product of said first value and said second value.

25. The system of claim 24, wherein said intrinsic function is independent of any other layout analysis data than said layout analysis data of said semiconductor device.

26. The system of claim 24, wherein said at least one layout-dependant parameter comprises a global constant or a local constant.

27. The system of claim 26, wherein said at least one layout-dependant parameter includes at least one stress component generated by said at least another semiconductor device and applied to said semiconductor device.

28. The system of claim 26, wherein said at least one layout-dependant parameter includes a threshold voltage shift component of said semiconductor device due to an areal reflectivity around said semiconductor device in a rapid thermal anneal process, wherein said areal reflectivity depends on said at least other layout analysis data.

29. The system of claim 26, wherein said at least one layout-dependant parameter includes a threshold voltage shift component or a stress component due to lithographic effects on said semiconductor device in physical implementation, wherein said lithographic effects depends on said at least other layout analysis data.

30. The system of claim 24, wherein said scaling modifier comprises a sum of a first scaling modifier component and a second scaling modifier component, wherein said first scaling modifier component is dependent on relative mobility shift of charge carriers in said semiconductor device, and wherein said second scaling modifier component is not dependent on said relative mobility shift.

* * * * *